(12) United States Patent
Warren et al.

(10) Patent No.: US 8,711,567 B2
(45) Date of Patent: Apr. 29, 2014

(54) ELECTRONIC HAND-HELD DEVICE

(75) Inventors: Morten Warren, Surrey (GB); Stephen De Saulles, London (GB)

(73) Assignee: Native Design Limited, London (GB)

( * ) Notice: Subject to any disclaimer, the term of this patent is extended or adjusted under 35 U.S.C. 154(b) by 348 days.

(21) Appl. No.: 13/140,735

(22) PCT Filed: Dec. 17, 2009

(86) PCT No.: PCT/GB2009/002915
§ 371 (c)(1),
(2), (4) Date: Jun. 17, 2011

(87) PCT Pub. No.: WO2010/070293
PCT Pub. Date: Jun. 24, 2010

(65) Prior Publication Data
US 2011/0249384 A1 Oct. 13, 2011

(30) Foreign Application Priority Data

Dec. 17, 2008 (GB) .................................. 0823008.8

(51) Int. Cl.
*H05K 5/00* (2006.01)
*H05K 7/00* (2006.01)
*H04M 1/00* (2006.01)
*G11B 3/70* (2006.01)

(52) U.S. Cl.
USPC . 361/727; 361/726; 361/679.27; 361/679.28; 361/379.29; 455/575.1; 455/575.3; 455/575.4; 369/282

(58) Field of Classification Search
USPC ............ 361/679.01–679.17, 679.08, 679.09, 361/679.21–679.3, 679.41–679.45, 361/679.55–679.59; 455/575.1, 575.3, 455/575.4, 575.8; 369/282, 291, 253, 369/44.16, 75.5
See application file for complete search history.

(56) References Cited

U.S. PATENT DOCUMENTS

| | | | |
|---|---|---|---|
| 5,790,370 A | 8/1998 | Merkel | |
| 8,108,014 B2 * | 1/2012 | Demuynck | 455/575.1 |

(Continued)

FOREIGN PATENT DOCUMENTS

| | | |
|---|---|---|
| EP | 1 638 298 A2 | 3/2006 |
| EP | 1 667 408 A1 | 6/2006 |

(Continued)

OTHER PUBLICATIONS

International Search Report (Form PCT/ISA/210) for corresponding International Application No. PCT/GB2009/002915.
Written Opinion (Form PCT/ISA/237) for corresponding International Application No. PCT/GB2009/002915.
United Kingdom Search Report for priority UK application No. GB0823008.8.

*Primary Examiner* — Jenny L Wagner
*Assistant Examiner* — Jerry Wu
(74) *Attorney, Agent, or Firm* — Merchant & Gould P.C.

(57) ABSTRACT

An electronic hand-held device, for example a mobile phone (10), includes a first unit (cover 12) and a second unit (keypad unit 14). The device (10) has a first configuration in which the first unit (12) is in a contracted position, and the second unit (14) is in a depressed position and positioned beneath the first unit (12); and a second configuration in which the first unit (12) is in a fully extended position, the second unit (14) is in a fully raised position, and the upper surfaces (12*u*, 14*u*) of the first and second units are adjacent to each other. The movement of the second unit (14) depends on the movement of the first unit (12) by moveable guide members (40) mounted along the lateral edges of the device (10). The guide member (40) may include a guide surface (140) shaped to hold the second unit (14) firmly in position in fully raised position.

17 Claims, 11 Drawing Sheets

(56) References Cited

U.S. PATENT DOCUMENTS

| | | | |
|---|---|---|---|
| 8,355,001 B1 * | 1/2013 | Betts-Lacroix et al. | 345/168 |
| 2003/0122690 A1 | 7/2003 | Hsu | |
| 2003/0193419 A1 | 10/2003 | Hsu | |
| 2004/0027335 A1 | 2/2004 | Lin | |
| 2005/0233785 A1 | 10/2005 | Park et al. | |
| 2005/0245297 A1 | 11/2005 | Lee et al. | |
| 2006/0045259 A1 | 3/2006 | Vizier | |
| 2006/0053847 A1 | 3/2006 | Taki et al. | |
| 2006/0111161 A1 | 5/2006 | Cha et al. | |
| 2006/0266632 A1 | 11/2006 | Jang | |
| 2007/0243897 A1 | 10/2007 | Maatta et al. | |
| 2008/0132303 A1 * | 6/2008 | Naukkarinen et al. | 455/575.4 |

FOREIGN PATENT DOCUMENTS

| | | |
|---|---|---|
| JP | 2003-058299 | 9/2004 |
| KR | 2006-0073086 | 6/2006 |
| KR | 2006-0081875 | 7/2006 |
| KR | 2006/0087013 | 8/2006 |
| WO | WO 2006/106374 A1 | 10/2006 |
| WO | WO 2008/004786 A1 | 1/2008 |
| WO | WO 2008/074358 A1 | 6/2008 |
| WO | WO 2008/080425 A1 | 7/2008 |

* cited by examiner

ELECTRONIC HAND-HELD DEVICE

This application is a National Stage Application of PCT/GB2009/002915, filed 17 Dec. 2009, which claims benefit of Serial No. 0823008.8, filed 17 Dec. 2008 in the United Kingdom and which applications are incorporated herein by reference. To the extent appropriate, a claim of priority is made to each of the above disclosed applications.

BACKGROUND OF THE INVENTION

The present invention concerns an electronic hand-held device. More particularly, but not exclusively, the invention relates to a device comprising first and second units mounted for movement relative to each other such that the device has a first configuration in which the first unit is in a contracted position, the second unit is in a depressed position, and the upper surface of the second unit is positioned beneath the first unit, and a second configuration in which the first unit is in an extended position, the second unit is in a raised position, and the upper surfaces of the first and second units are adjacent to each other.

There are proposals in the prior art for mobile telephones having such an arrangement of units. In these proposals, the first unit is typically in the form of a slidably mounted cover. As such, these mobile telephones are typically referred to as slider phones and typically have a second unit in the form of keypad unit. The cover typically comprises a display screen. Thus, the display screen is movable to selectively reveal and conceal a keypad unit, which when revealed rises from a depressed position to a raised position so that its upper surface is adjacent to, and typically flush with, with the upper surface of the display screen.

Some slider phones of the prior art are arranged such that the keypad unit is simply sprung towards the raised position so that once the display screen unit is moved to reveal completely the keypad unit, the keypad unit is free to pop up under the action of the spring. An example of such a device is proposed in US 2005/0233785 (Samsung Electronics Co. Ltd). US 2005/0245297 (Samsung Electronics Co. Ltd) also discloses a phone with a pop-up keypad unit, wherein the movement of the pop-up keypad unit towards the raised position is dependent on the longitudinal sliding movement of an upper keypad unit. In this case a protrusion on the pop-up keypad is received by a channel connected to the upper keypad unit, such that towards the end of the movement of the upper keypad unit, the longitudinal movement of the channel causes the pop-up keypad to be raised. A problem with the devices of either US 2005/0233785 or US 2005/0245297 is that if the user exerts any significant force downwardly on the keypad there is a tendency for the keypad to move downwards, possibly causing the display screen to retract.

WO 2008/074358 (Nokia Corporation) solves the above problem associated with US 2005/0245297 by providing a device having a cam mechanism which provides a reversible locked configuration allowing a keypad to be locked in a raised position when the device is in an "in-use" position. The keypad may be unlocked to allow it to be lowered and to allow a display screen to be moved to conceal the keypad, by means of pulling the display screen to further extend it, before then allowing it to retract under the action of a spring. The cam mechanism for achieving this function includes a cam surface defining a complicated circular path followed by a guide pin such that the path followed by the guide pin when moving the device from the closed configuration to the configuration in which the keypad is locked in its raised position is different from the path followed by the guide pin when moving the device from the locked-open position to the closed configuration. Thus, whilst WO 2008/074358 provides a means of locking a keypad in a raised position, the mechanism proposed is complicated and requires the user to manipulate the device in a counter-intuitive manner in order to move the device from it locked open state to its closed state. WO 2008/074358 also proposes providing biasing means directly beneath the keypad, thereby affecting the amount of space beneath the keypad useable for other purposes.

Proposals which include suggestions of providing, beneath a pop-up keypad unit, mechanical means for biasing or guiding movement of the keypad unit suffer from further disadvantages. Providing such mechanical means beneath the keypad unit takes up valuable space that could be better utilised by other components of such devices.

Furthermore, the physical space within a hand-held electronic device is inherently limited. The space requirements for mechanisms that are used to control and/or guide movement of a display screen unit which moves away from the rest of the device when revealing the keypad unit are further restricted by the dimensions of both the display screen unit and the rest of device (particularly the dimensions in the direction of travel of the display screen unit) as a result of the changing geometry of the device as between its first and second configurations and in view of the length of travel of the display screen unit between its extreme positions.

The present invention seeks to mitigate the above-mentioned problems. Alternatively or additionally, the present invention seeks to provide an improved electronic hand-held device.

SUMMARY OF THE INVENTION

The present invention provides an electronic hand-held device comprising a housing, a first unit having a first upper surface and a second unit having a second upper surface, wherein the first unit is mounted for movement relative to the housing from a contracted position to a fully extended position, the second unit is mounted for movement relative to the housing from a depressed position to a fully raised position, the first unit is movably mounted relative to the second such that the handheld device has at least two configurations, including:
a first configuration in which the first unit is in the contracted position, the second unit is in the depressed position, and the second upper surface is positioned beneath the first upper surface, and
a second configuration in which the first unit is in the fully extended position, the second unit is in the fully raised position, and the second upper surface is adjacent to the first upper surface.

According to a first aspect of the present invention the movement of the second unit advantageously depends on the movement of the first unit by means of one or more guide members and being moveable both relative to the first unit and to the second unit.

Preferably the guide members are mounted along the lateral edges of the device. As a result of the provision of the laterally positioned guide members, it is not necessary to provide, beneath the second unit, means for moving or resiliently urging the second unit. The space beneath the second unit may therefore be better utilised. In one embodiment of the present invention, the space beneath the second unit is used to house a battery.

In certain embodiments of the invention, the device is so arranged that in its second configuration, the second upper surface is level with the first upper surface. The second upper surface may be substantially flush with the first upper surface in the second configuration. The second upper surface may be directly adjacent to the first upper surface. For example, the structure defining the second upper surface may abut the structure defining the first upper surface.

Each guide member may be in the form of a longitudinally extending guide member, for example a longitudinally arranged guide plate. Each guide member may be arranged to move along the length of the device. Each guide member may be arranged for translational movement. Each guide member may be mounted for sliding movement.

The device may be so arranged that the first unit causes movement of the guide member for only a portion of the movement at or near the position in which the device is in the second configuration. The device may be arranged such that for part of the movement of the first unit between the contracted position and the fully extended position, there is no relative movement between, a part of the guide member and the first unit, and such that for part of the movement of the first unit between the contracted position and the fully extended position, there is no relative movement between said part of the guide member and the second unit. For example, the device may be so arranged that for an initial part of the movement of the first unit from the contracted position to the extended position there is substantially no relative movement between the guide member and the second unit (because the guide member and the second unit both remain stationary relative to the housing), whereas for a later part of the movement there is substantially no relative movement between the guide member and the first unit (because they move together).

The movement of the second unit may depend on the movement of the first unit by means of a guide member arranged to couple with, and decouple from, the first unit. Each guide member may have a releasably engaging member. The releasably engaging member may be provided to releasably engage a corresponding part on the first unit. For example, the arrangement may be such that as the first unit moves past a position during movement towards the fully extended position, the engaging member engages the corresponding part on the first unit. Also, as the first unit moves past a position during movement towards the contracted position, the engaging member may be arranged to disengage from the corresponding part on the first unit. The position at which the engaging member engages the corresponding part on the first unit when moving towards the fully extended position is preferably the same as the position at which the engaging member disengages from the corresponding part on the first unit when moving towards the contracted position. The engaging member may be in the form of a latch. The latch may be moveable (for example rotatable) between a coupled position and an uncoupled position.

One of the guide member and the second unit may comprise a guide surface, whereas the other of the guide member and the second unit may comprise a guide surface follower. The guide surface and corresponding guide surface follower may be arranged such that movement of the guide surface relative to the housing causes movement of the guide surface follower relative to the housing and relative to the guide surface, such that movement of the guide member relative to the second unit causes movement of the second unit relative to the housing. For example, each guide member may comprise a guide surface which engages with a guide surface follower of the second unit. The guide surface and corresponding guide surface follower may be considered as forming a cam mechanism. A part of the guide surface may be shaped to hold the second unit firmly in position in the fully raised position, when the first unit is in said fully extended position. Thus, the second unit, when in its fully raised position, may be arranged to resist downwards movement (or more preferably prevent any significant downwards movement) when pressure is exerted by a user on the second upper surface, whereas movement of the first unit is able to cause downwards movement of the second unit, by means of the guide surface and corresponding guide surface follower. The guide surface may be defined by a channel, whereas the corresponding guide surface follower may be defined by a protrusion, for example a pin, that is accommodated within the channel. The channel preferably defines a single path extending from one end to an opposite end. The channel preferably has at each end a flat longitudinally extending channel section. The flat sections at each end may be joined by a diagonally extending channel section. The channel may be generally Z-shaped when viewed from the side. The second unit may comprise a plurality of legs. The guide surface followers may be part of the legs. The legs may be slidably mounted on housing, thus facilitating sliding movement of the second unit between its fully raised position and its lowered position.

The first part may be provided with a spring mechanism which, when the first part is positioned near to the fully extended position, resiliently urges the first part towards the fully extended position. The first part may be provided with a spring mechanism which, when the first part is positioned near to the contracted position, resiliently urges the first part towards the contracted position. The same spring mechanism may be able to resiliently urge the first part towards the fully extended position and to resiliently urge the first part towards the contracted position, depending on the position of the first part. The spring mechanism may be a rotatable over-centre spring mechanism. The second part may be resiliently urged towards its fully raised position when near its fully raised position primarily, and preferably solely, as a result of the combination of the resilient urging of the first part to the fully extended position by the spring mechanism and the dependency of the movement of the second unit on the movement of the first unit. No other springs or other resilient means, other than said spring mechanism, thus need be provided to provide the urging force that urges the second unit towards its fully raised position.

The first unit may be mounted for movement along a first path from the contracted position to the fully extended position, and along the same first path for movement from the fully extended position to the contracted position. The second unit may be mounted for movement along a second path from a depressed position to a fully raised position and along the same second path for movement from the fully raised position to the depressed position. The device may be so arranged that the position of the second unit along the second path of movement is dictated by the position of the first unit along the first path of movement independent of the direction of travel. The device may therefore be moved between the first and second configurations by means of simple intuitive movements effected by the user. There is for example no need, after having moved the device from the first configuration to the second configuration, to release the device from its second configuration before moving the device back to the first configuration.

The first unit may be mounted for sliding movement relative to the housing from the contracted position to the fully extended position. The first unit may protrude beyond the top of the device when in the fully extended position. The second unit may be mounted for sliding movement from the depressed position to the fully raised position. The second unit may comprise a data entry means, for example a keypad.

The keypad may be a virtual keypad or may be a mechanically implemented keypad. The data entry means may be in the form of a touch-screen, or a touch-capacitive screen. The first unit may comprise a display screen. The first unit may comprise a data entry means, for example a touch-screen. Both the first and second units may each comprise a data entry means. For example, a touch-screen area may extend from the first unit to the second unit, preferably in the case where the second upper surface is substantially flush with the first upper surface in the second configuration. The first unit may be in the form of a cover, for example a sliding cover. The cover may be of a size that substantially covers the entire upper surface of the device when in the contracted position. The invention may have application in relation to any electronic device designed for hand-held use. For example, the device may be in the form of a hand-held mobile telecommunications device, such as a mobile phone.

The device may be generally rectangular in shape, for example when in the first configuration, possibly with rounded edges and corners. The device may be longer in height than in width when in the first configuration. The device may be longer in height than in width when in the second configuration. Such a shape would be suitable for example when the device is in the form of a mobile phone of a type not provided with a full alphanumeric keypad (e.g. a QWERTY keypad).

The device may be longer in width than in height when in the first configuration. The device may be longer in width than in height when in the second configuration. Such a shape would be suitable for example when the device in the form of a mobile PDA of a type provided with a full alphanumeric keypad (e.g. a QWERTY keypad). The second unit may be longer in width than in height. Such a shape may be especially suitable, in the case where the second unit comprises a full alphanumeric keypad.

The device may be generally rectangular in shape in the first configuration. When viewed in plan when the device is in the second configuration, the first unit may extend beyond the upper edge of the device when in the first configuration. The first upper surface and the second upper surface may have substantially the same width. The first upper surface and the second upper surface may, when the device is in the second configuration, define a generally rectangular shape.

The first unit may comprise a loudspeaker device, for example to enable listening when the user engages in a telephone conversation. The second unit may comprise a microphone, for example to enable talking when the user engages in a telephone conversation.

According to a second aspect of the present invention, there is also provided an electronic hand-held device comprising a housing, a first unit having a first upper surface and a second unit having a second upper surface, wherein the first unit is mounted for movement relative to the housing from a contracted position to a fully extended position, the second unit is mounted for movement relative to the housing from a depressed position to a fully raised position, the first unit is movably mounted relative to the second such that the handheld device has at least two configurations, including:

a first configuration in which the first unit is in the contracted position, the second unit is in the depressed position, and the second upper surface is positioned beneath the first upper surface, and a second configuration in which the first unit is in the fully extended position, the second unit is in the fully raised position, and the second upper surface is adjacent to and level with the first upper surface, and wherein the movement of the second unit depends on the movement of the first unit by means of a guide surface, and wherein one end of the guide surface is shaped to hold the second unit firmly in position in said fully raised position, when the first unit is in said fully extended position.

According to a third aspect of the present invention, there is further provided an electronic hand-held device comprising a housing, a first unit having a first upper surface and a second unit having a second upper surface, wherein the first unit is mounted for movement relative to the housing along a first path from a contracted position to a fully extended position, and along the same first path for movement from the fully extended position to the contracted position, the second unit is mounted for movement relative to the housing along a second path from a depressed position to a fully raised position and along the same second path for movement from the fully raised position to the depressed position, the first unit is movably mounted relative to the second such that the handheld device has at least two configurations, including:

a first configuration in which the first unit is in the contracted position, the second unit is in the depressed position, and the second upper surface is positioned beneath the first upper surface, and a second configuration in which the first unit is in the fully extended position, the second unit is in the fully raised position, and the second upper surface is adjacent to and level with the first upper surface, and wherein the position of the second unit along the second path of movement is dictated by the position of the first unit along the first path of movement independent of the direction of travel.

According to a fourth aspect of the present invention, there is yet further provided an electronic hand-held device comprising a housing, a first unit having a first upper surface and a second unit having a second upper surface, wherein the first unit is mounted for movement relative to the housing from a contracted position to a fully extended position, the second unit is mounted for movement relative to the housing from a depressed position to a fully raised position, the first unit is movably mounted relative to the second such that the handheld device has at least two configurations, including:

a first configuration in which the first unit is in the contracted position, the second unit is in the depressed position, and the second upper surface is positioned beneath the first upper surface, and a second configuration in which the first unit is in the fully extended position, the second unit is in the fully raised position, and the second upper surface is adjacent to and level with the first upper surface, and wherein the movement of the second unit depends on the movement of the first unit by means of a guide member, the device being arranged for relative movement between at least a part of the guide member and the first unit, and for relative movement between said at least a part of the guide member and the second unit.

The device of the fourth aspect of the present invention may be arranged such that for part of the movement of the first unit between the contracted position and the fully extended position, there is substantially no relative movement between said at least a part of the guide member and the first unit (and preferably relative movement between said at least a part of the guide member and the second unit). The device may be arranged such that for part of the movement of the first unit between the contracted position and the fully extended position, there is substantially no relative movement between said at least a part of the guide member and the second unit (and preferably relative movement between said at least a part of the guide member and the first unit). Such an arrangement advantageously allows the guide member to guide and/or cause movement of the second unit only when required, possibly allowing better use of space in the device and/or providing a more elegant mechanism.

The device may be arranged such that the movement of the second unit depends on the movement of the first unit by means of a guide member arranged to couple with and decouple from the first unit. The guide member may for example be mounted along the lateral edges of the device. The guide member may be moveable both relative to the first unit and to the second unit. The guide number may be moveable relative to the housing.

It will of course be appreciated that features described in relation to one feature or aspect of the present invention may be incorporated into other aspects of the present invention or the broadest aspect first recited above. For example, the device of any of the second to fourth aspects of the invention may incorporate any of the features described with reference to the device of the first aspect of the invention and vice versa.

DESCRIPTION OF THE DRAWINGS

Embodiments of the present invention will now be described by way of example only with reference to the accompanying drawings of which:

FIG. 13b shows the inner surface of the guide plate shown in FIG. 13a;

DETAILED DESCRIPTION

Figure 1:
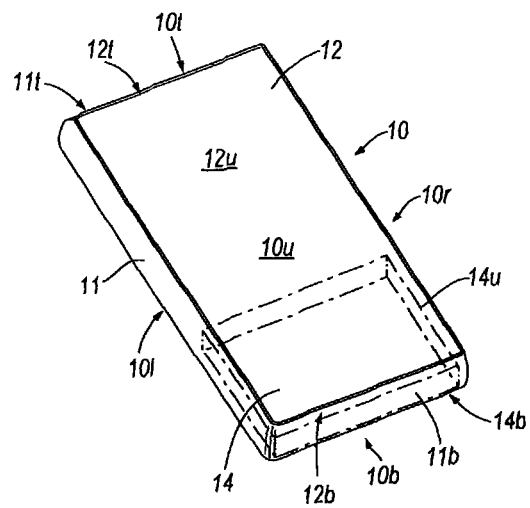
FIG. 1 shows a perspective view of a mobile telephone according to a first embodiment of the invention in which the phone is in a closed configuration.
Figure 2:
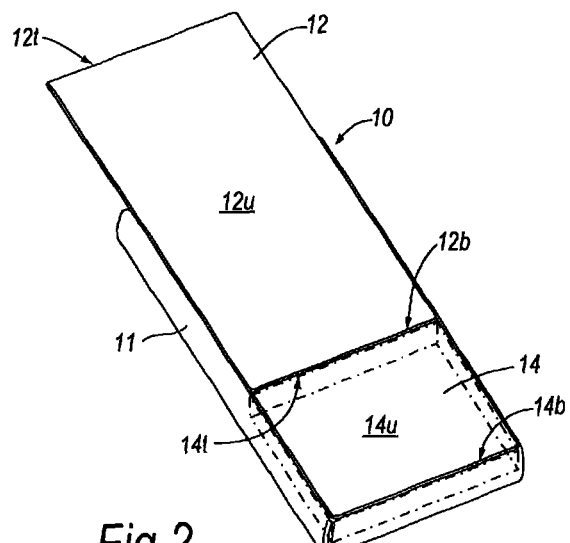
FIG. 2 shows a perspective view of the phone of FIG. 1 in its open configuration.
Figure 3:
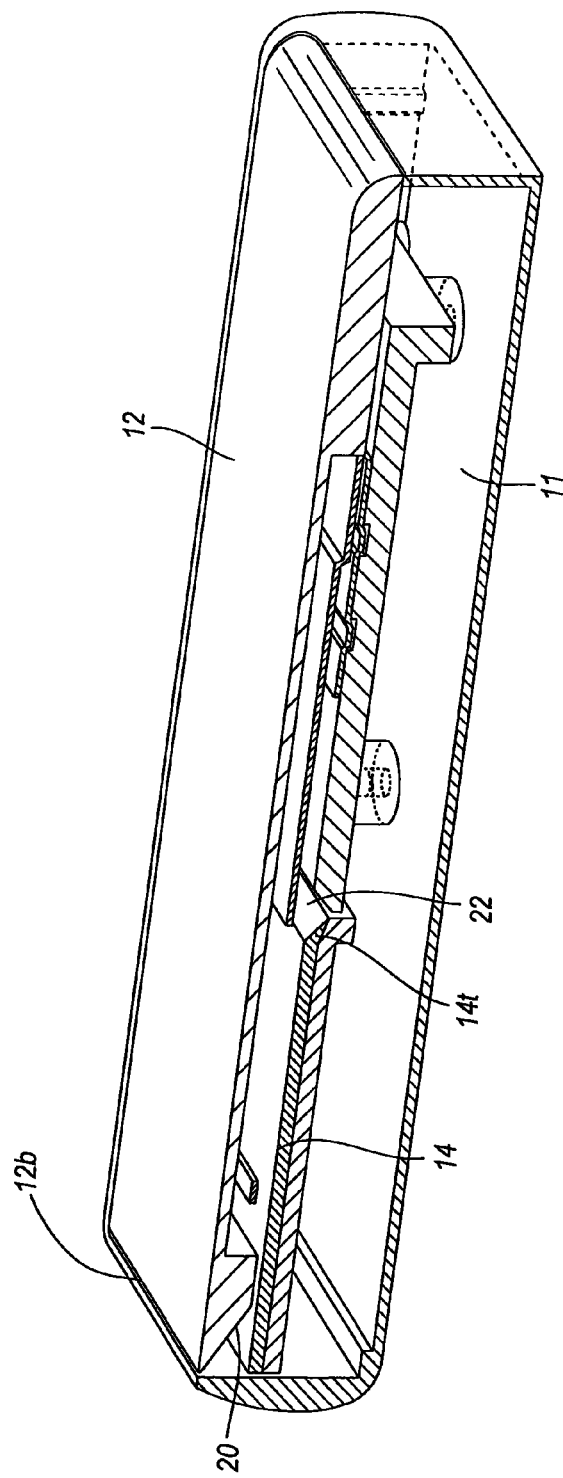
FIG. 3 shows a cut-away view of the phone of FIG. 1 in its closed configuration from the right hand side.
Figure 4:
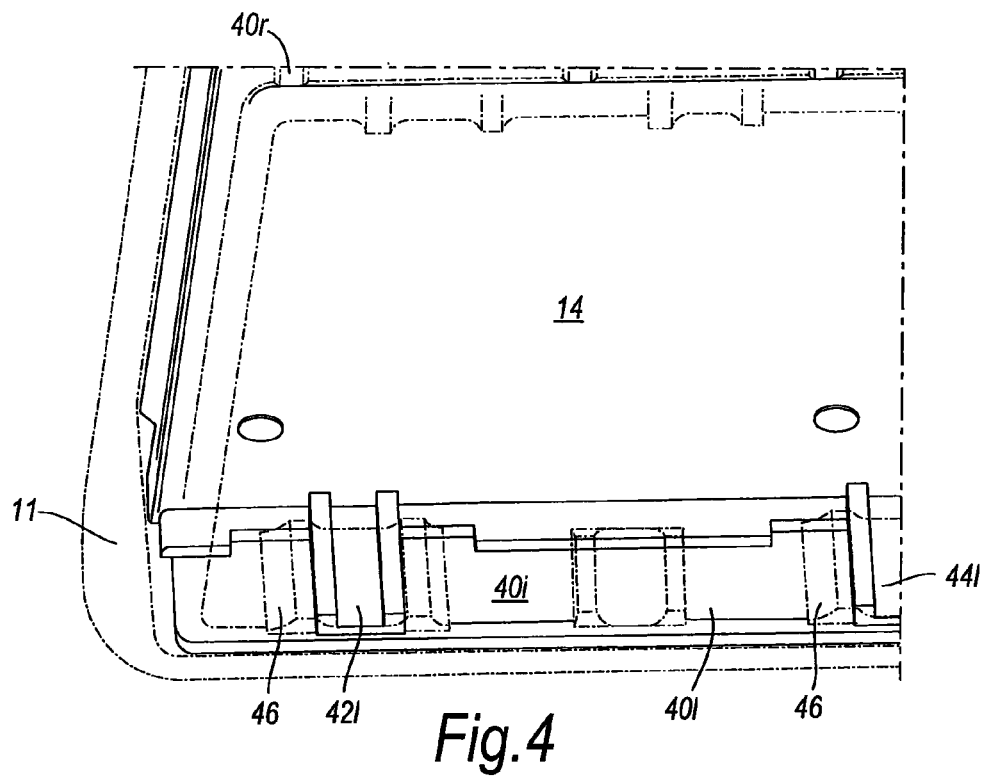
FIG. 4 shows a partial perspective view of the underside of the bottom left end of the phone of FIG. 1 in its closed configuration in which the housing of the phone has been depicted as transparent in order to display certain features that would be ordinarily hidden to the user.
Figure 5:
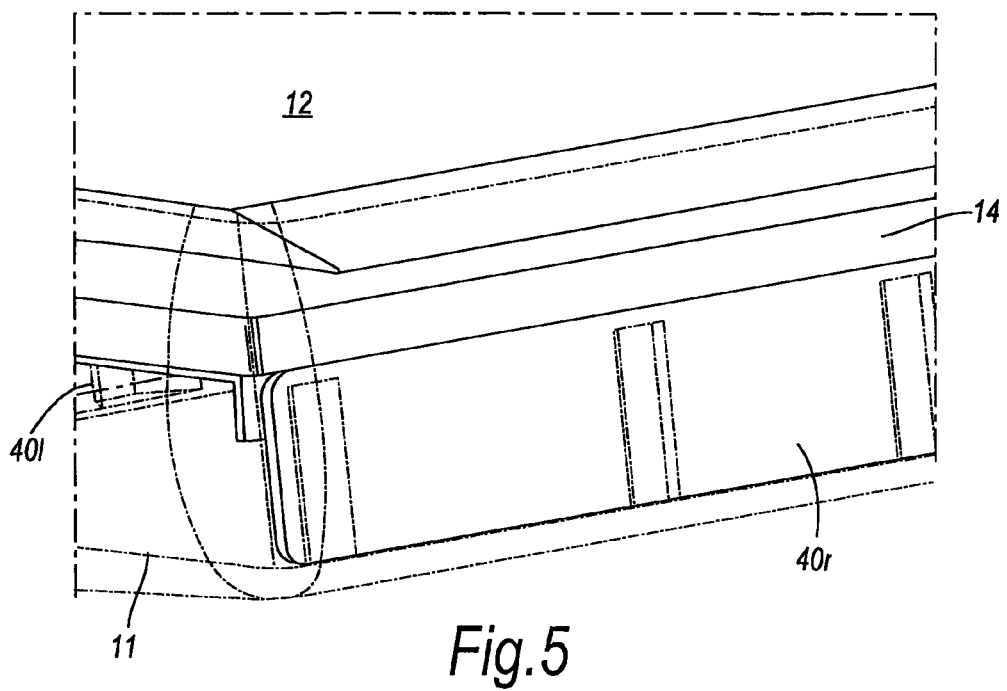
FIG. 5 shows a partial perspective view of the bottom right hand corner of the phone of FIG. 1 in its closed configuration in which the housing has been depicted as transparent.

FIGS. 1 to 14 show an electronic hand-held device in the form of a mobile telephone device in accordance with a first embodiment of the present invention. As shown in FIG. 1, the phone 10 comprises a housing 11, a first unit in the form of a cover 12 and a second unit in the form of a concealable keypad unit 14. The cover 12 is mounted for sliding movement relative to and along the length of the housing 11 from a contracted position (as shown in FIG. 1) to a fully extended position (as shown in FIG. 2). The phone 10 thus has two principal configurations: a first, closed, configuration as shown in FIG. 1 and a second, open, configuration as shown in FIG. 2.

If one considers the phone 10 to have a top end 10t and a bottom end 10b, with reference to the orientation of the phone when held in use, then the keypad unit 14 is disposed at the bottom end 10b of the phone 10. The phone 10 thus has a top end 10t, a bottom end 10b, an upper face 10u, a lower face (not visible in FIG. 1) and left and right sides, 10l, 10r.

The keypad unit 14 is mounted for sliding movement relative to the housing 11 from a depressed position to a fully raised position. The upper surface 14u of the keypad unit comprises a keypad with keys (not shown for the sake of clarity). The upper surface of the cover 12u comprises a display screen (not shown for the sake of clarity) having touch-screen function. The direction of movement of the keypad unit 14 may be considered as being perpendicular to the upper surface of the cover 12u (i.e. in the same direction as the thickness of the phone).

FIG. 1 shows the phone 10 in its closed configuration. The cover 12 is in a contracted position and the keypad unit 14 is in a depressed position. The keypad unit 14, and therefore the upper surface 14u of the keypad unit, is positioned beneath the cover 12, and in particular, the upper surface 12u of the cover. The keypad unit 14 is completely hidden from view (i.e. concealed) by the cover 12. The cover 12 is flush with the housing 11 and does not protrude beyond the periphery of the housing 11. The top and bottom edges 12t, 12b of the cover 12 therefore lie substantially parallel to and level with the top and bottom edges 11t, 11b, respectively, of the housing 11. The bottom edge 14b of the keypad unit 14 lies substantially parallel to and level with the bottom edge 12b of the cover 12. As will be seen from FIG. 3 the bottom edge 12b of the cover 12 has a chamfer 20 and the top edge 14t of the keypad unit 14 has a chamfer 22.

The cover 12 is mounted for sliding movement between a retracted position shown in FIG. 1 and a fully extended position shown in FIG. 2. The cover 12 is linked to the housing 11 via an over-centre spring (not shown), which both acts to urge the cover 12 to the fully extended position when in a region between centre and the fully extended position and acts to urge the cover 12 to the retracted position when in a region between centre and the retracted position.

FIG. 2 shows the phone 10 in its open configuration. The cover 12 is in a fully extended position and the keypad unit 14 is in a fully raised position. In this configuration, the upper surface 14u of the keypad unit 14 is substantially flush with the upper surface 12u of the cover 12. Also, the bottom edge 12b of the cover lies substantially parallel to and level with the top edge 14t of the keypad unit. In the open configuration, the keypad unit 14 is arranged to resist downward pressure, for example, caused by the user pressing keys on the keypad unit 14.

The movement of the cover 12 from the contracted position shown in FIG. 1 to the fully extended position shown in FIG. 2 is along a first, single, path. The movement of the cover 12 from the fully extended position shown in FIG. 2 to the contracted position shown in FIG. 1 is along the same said first, single, path. Similarly, the movement of the keypad unit 14 from the depressed position shown in FIG. 1 to the fully raised position shown in FIG. 2 is along a second, single, path. The movement of the keypad unit 14 from the fully raised position shown in FIG. 2 to the depressed position shown in FIG. 1 is along the same said second, single, path. As will be explained in further detail below, the position of the keypad unit 14 along the second path is dictated by the position of the cover 12 along the first path independent of the direction of travel. Thus, the raising and depressing (lowering) of the keypad unit 14 may be effected by the user of the phone simply by moving the cover 12 between the contracted and extended positions. There is no need for the keypad unit 14 to be mounted via springs or other resilient means to the housing 11 to assist in its movement between the raised and depressed positions and there is no need for complicated movement by the user to switch between using the device in its open and closed configurations. Moreover, the keypad unit is resiliently urged towards its fully raised position when near its fully raised position by means of the combination of the over-centre spring (acting between the cover 12 and the housing 11, mentioned above, but not shown in the Figures) and the dependency of the movement of the keypad unit 14 on the movement of the cover 12. Also, the phone 10 is arranged such that, when in the open configuration, movement of the keypad unit 14 relative to the housing 11 is caused by movement of the cover 12, and not by attempted movement of the keypad unit 14. Movement of the keypad unit 14 is thus subservient to movement of the cover 12.

Figure 8:
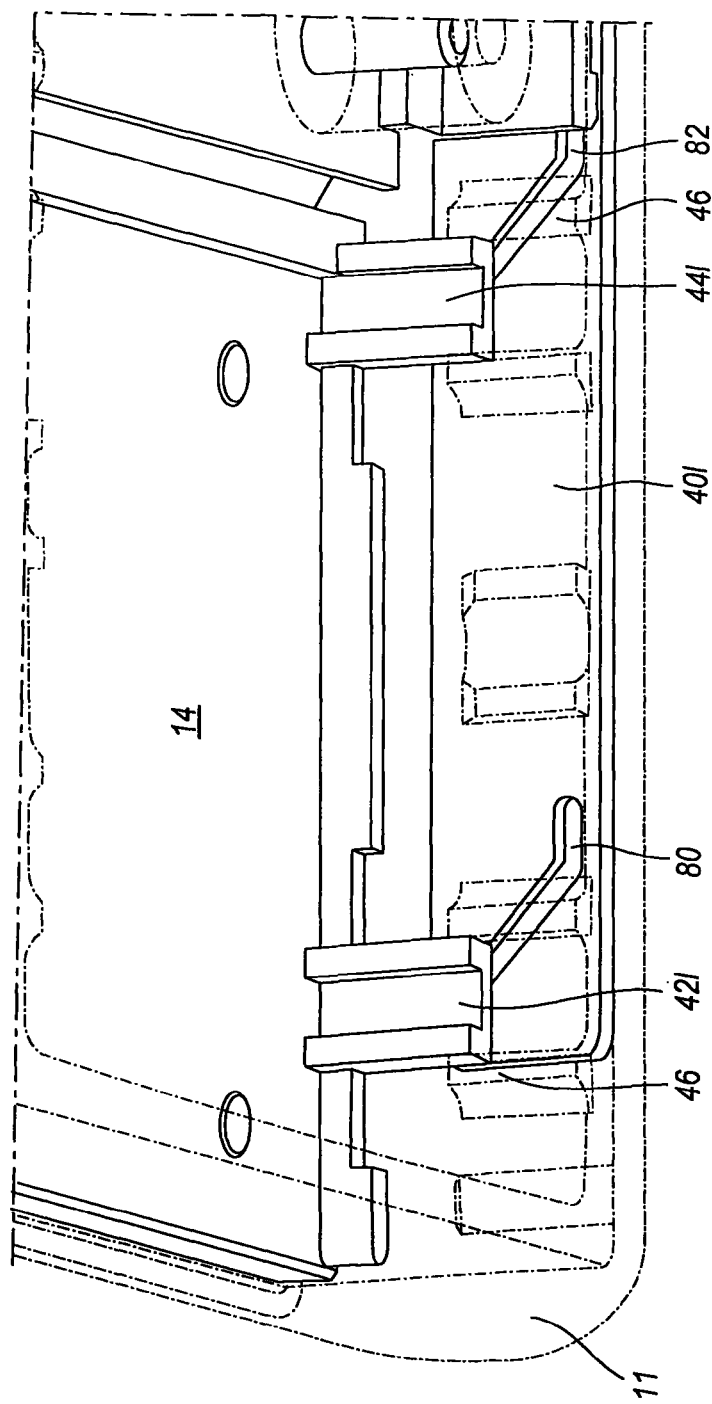
FIG. 8 shows a partial perspective view of the underside of the bottom left-hand end of the phone of FIG. 1 in its open configuration in which the housing has been depicted as transparent.
Figure 12:
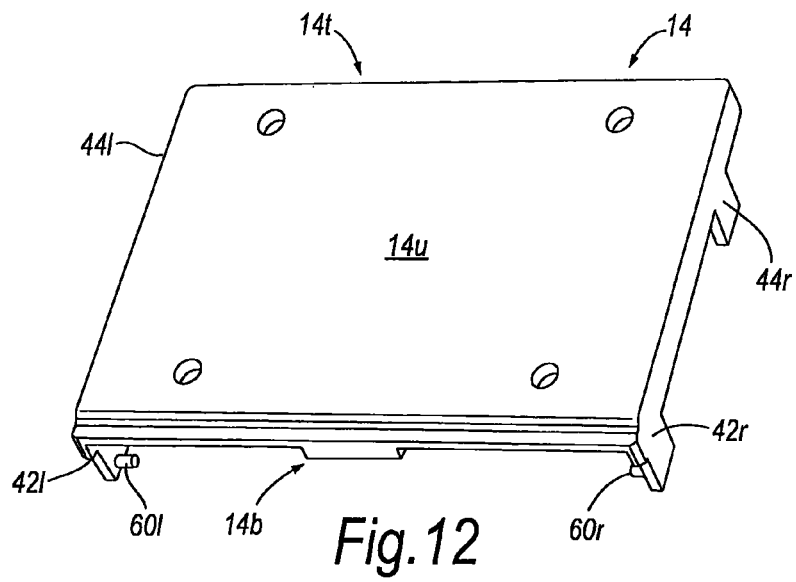
FIG. 12 shows a perspective view of the upper side of the keypad unit of the phone.
Figure 13A:
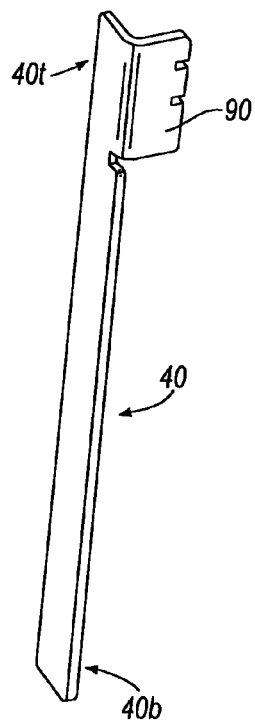
FIG. 13a shows a perspective view of an outer surface of a guide plate of the phone.
Figure 13B:
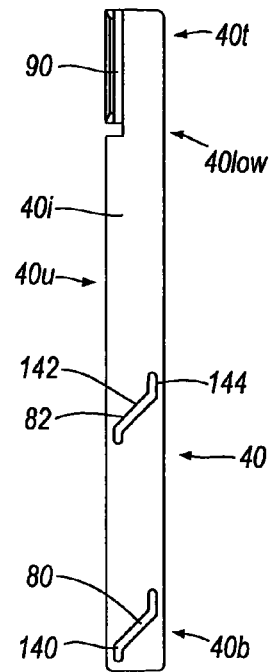

The means for facilitating the interdependent movements of the cover 12 and the keypad unit 14 along their respective single paths of movement will now be explained. The housing 11 includes two guide plates 40l and 40r positioned at the lateral edges of the housing, one on the left side and one on the right side, as shown in FIGS. 4 to 9. A guide plate 40 is shown in isolation in FIGS. 13a and 13b. The guide plates 40 are mounted for sliding movement along the length of the phone 10. At the bottom end 40b (along the length of the phone) of each guide plate 40 there is, on the inwardly facing surface 40i of the guide plate 40, a cam surface defined by a channel 80, as shown in FIGS. 8 and 13b. With reference to FIGS. 8 and 12, the keypad unit 14 includes at its bottom end 14b (along the length of the phone) two pins 60l and 60r, one on a bottom leg 42l on the left side and one on a bottom leg 42r on the right side, each pin 60 being accommodated in the corresponding channel 80, such that movement of the guide plate 40 in a lengthwise direction can raise or lower the keypad unit 14 (as will be explained in further detail below). The keypad unit 14 further includes at its top end 14t (along the length of the phone) two further pins 62l and 62r, one on a top leg 44l on the left side and one on a top leg 44r on the right side, each pin 62 being accommodated in a corresponding cam surface (channel 82) in the guide plate 40, identically shaped to the aforementioned channels 80 at the bottom end 40b of the guide plates.

The four legs 42l, 42r, 44l and 44r of the keypad unit 14 are accommodated in four sliding channels 46 on the housing 11 arranged to allow the keypad unit 14 to slide from a depressed position to a raised position (in a direction parallel to the thickness of the device).

Figure 9:
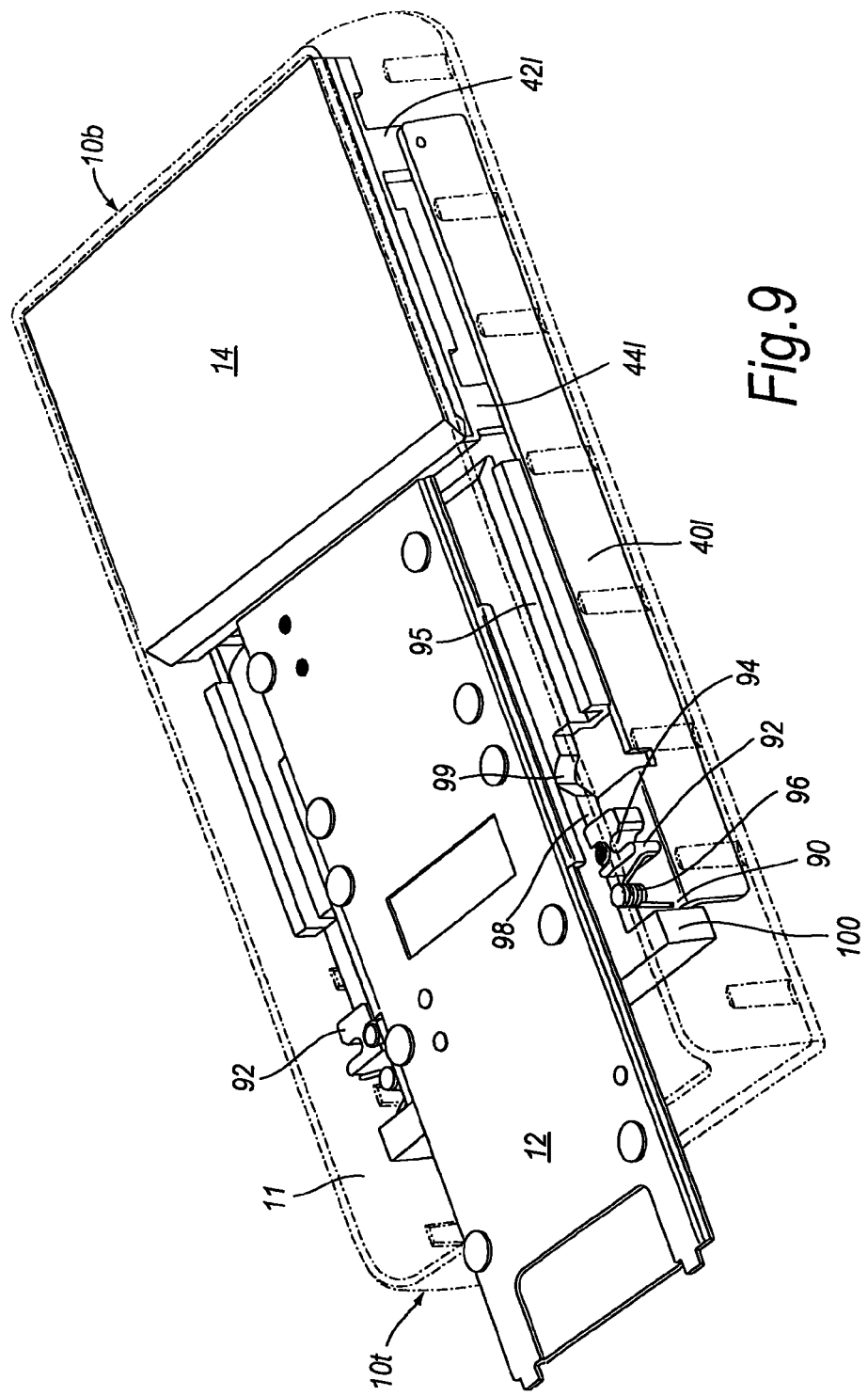
FIG. 9 shows a perspective view of the phone of FIG. 1 in its open configuration in which part of the cover is not shown and the housing is depicted as transparent thereby showing a catch mechanism of the phone.
Figure 10:
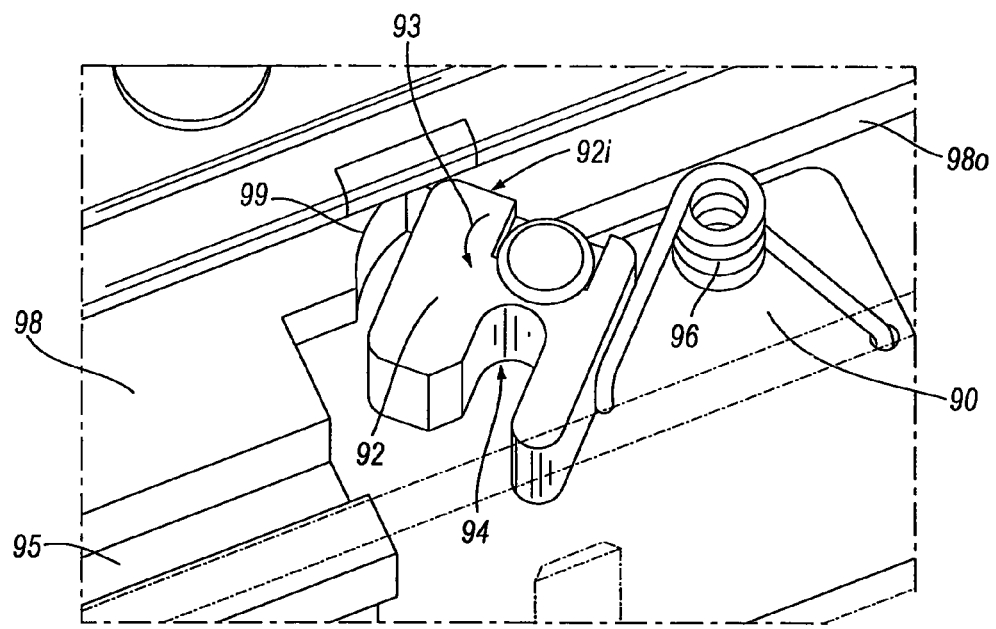
FIG. 10 shows a close-up perspective cut-away view of part of the phone showing the catch mechanism while the phone is in its closed configuration.
Figure 11:
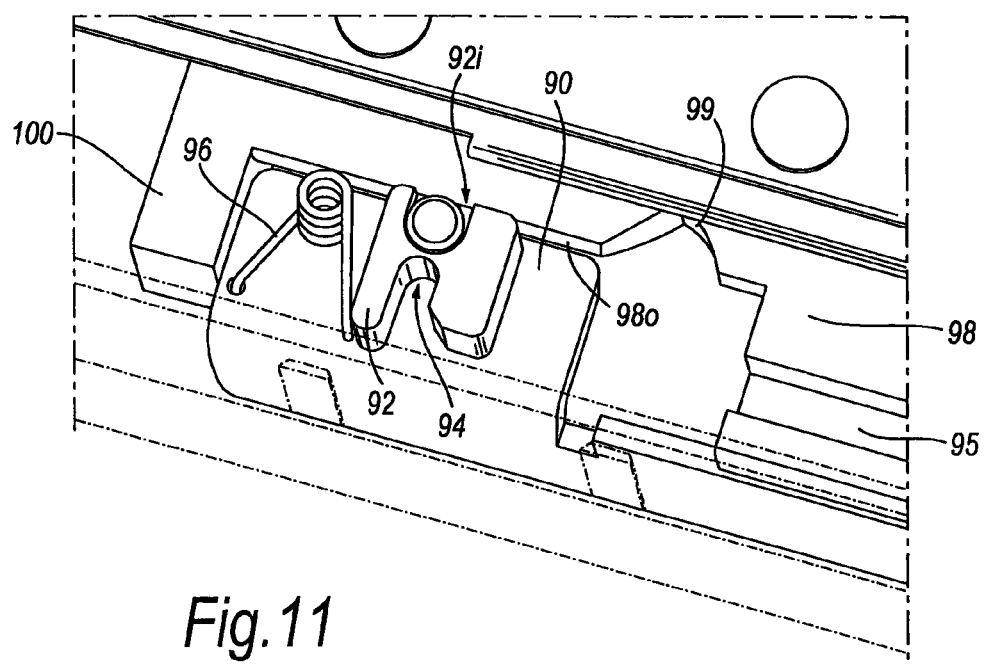
FIG. 11 shows a close-up perspective cut-away view of part of the catch mechanism while the phone is in its open configuration.

Each guide plate 40 also includes, at its top end 40t (along the length of the phone), a flange 90. On the upper surface of the flange, there is mounted a rotatably mounted latch 92 having a recess 94 as shown in FIGS. 9 to 11. The latch 92 is resiliently urged towards the bottom end 10b (lengthwise) of the phone by a spring 96 mounted adjacent to the latch 92. The housing 11 includes a ledge 98 which runs parallel to the length of the phone 10. The ledge 98 includes a recess 99 shaped to accommodate the latch 92 when the phone is in the closed configuration. The cover 12 includes two dowel pins (not shown) which extend into the phone in a direction perpendicular to the surface 12u of the cover 12. When the cover 12 is moved from the contracted position, the dowel pin on the cover moves along a channel 95 formed in the ledge 98. Just before the cover 12 reaches the fully extended position, the dowel pin on the cover 12 is received by the recess 94 in the latch 92. Further movement of the cover 12 towards the fully extended position causes the latch 92 to rotate (arrow 93) towards the top end 10t of the phone against the action of the spring 96. The inner surface 92i of the latch 92 rotates until it is parallel with, and abuts against, the outer surface 98o of the ledge 98. From this point onwards, the latch 92 slides against the ledge surface 98o, unable to rotate about its axis. Given that the latch 92 is mounted on the guide plate 40, movement of the latch 92 relative to the ledge surface 98 causes movement of the guide plate 40 relative to the housing 11. Thus, during yet further movement of the cover 12 towards the fully extended position, the guide plate 40 is caused to slide along the housing 11 together with the cover 12.

Figure 6:
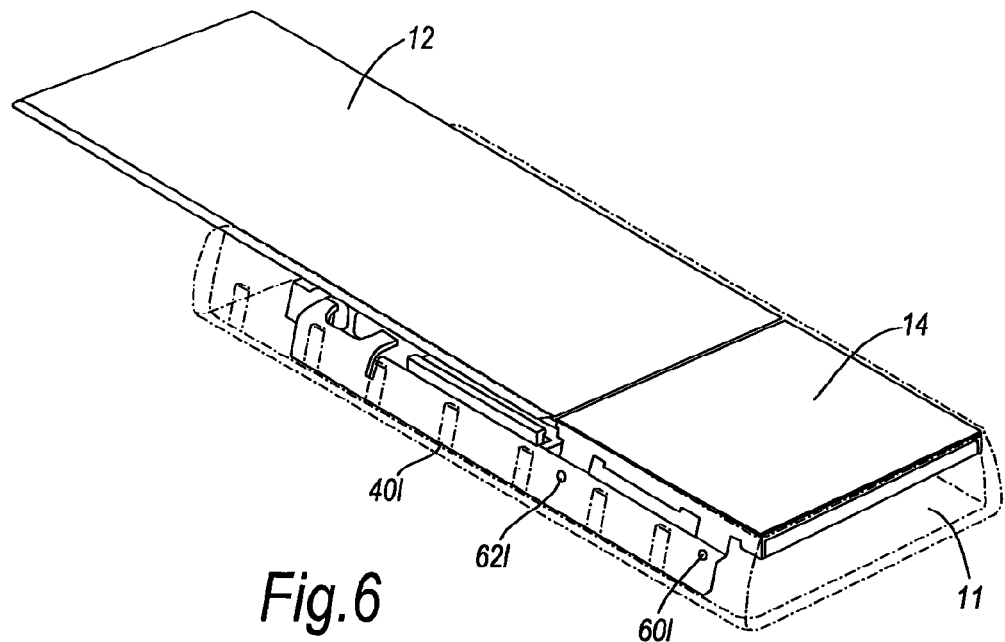
FIG. 6 shows a perspective view of the phone of FIG. 1 in its open configuration in which the housing has been depicted as transparent.
Figure 7:
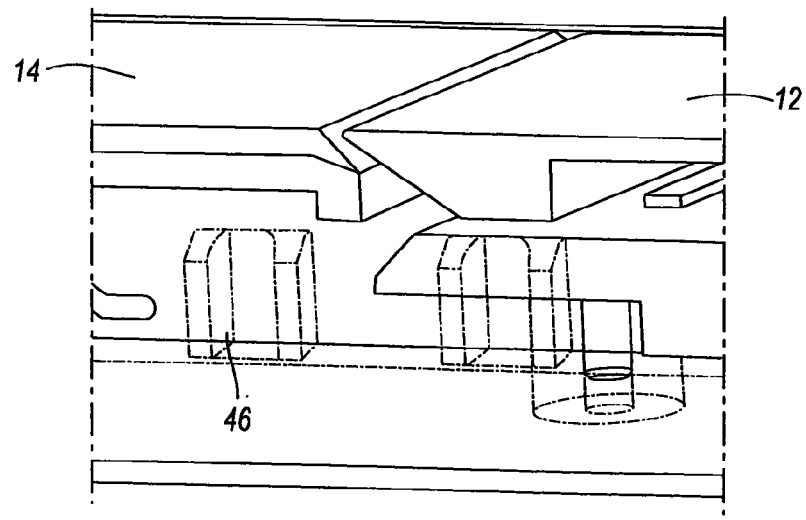
FIG. 7 shows a partial perspective view, taken from the right-hand side of the device, of a top edge of a keypad unit and the bottom edge of a cover of the phone of FIG. 1 when it is in its open configuration in which the housing has been depicted as transparent.

As the cover 12 and guide plates 40 move together towards the fully extended position, the channels 80, 82 in the guide plates 40 move relative to the pins 60 and 62 on the keypad unit 14. (FIG. 6 shows the locations of the left-hand pins 60l, 62l, despite the pins being hidden from view in that Figure). The channels 80, 82 have a shape that resembles a horizontally stretched Z-shape as shown in FIGS. 13b and 14a to 14c. Thus each channel 80 has an upper horizontal section 140 extending towards the top end 40t of the guide 40 (aligned with the length of the phone 10), then a diagonal section 142 extending towards the lower surface 40 low of the guide and the top end 40t of the guide 40, then a lower horizontal section 144 extending towards the top end 40t of the guide.

Figure 14A:
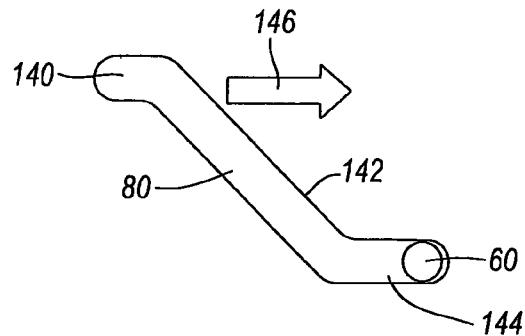
FIGS. 14a to 14c are schematic views showing the relative motion of a pin attached to the keypad unit and a groove in the guide plate as the phone moves from its closed configuration to its open configuration.
Figure 14B:
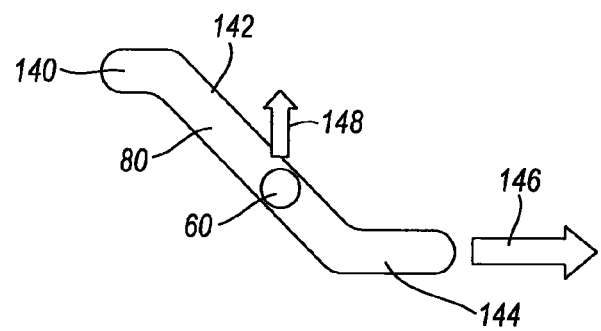
Figure 14C:
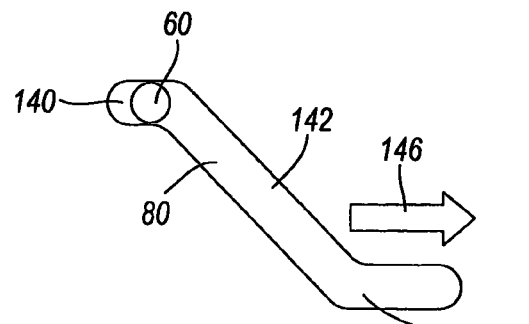

As explained above, when moving the cover 12 from the contracted position to the extended position, the cover 12 couples with the guide plates 40 towards the end of the movement. Thus, for an initial part of the Movement of the cover from the contracted position to the extended position, there is no relative movement between the guide member and the keypad and for a later part of the movement (of the cover from the contracted position to the extended position), there is no relative movement between the guide member and the cover (because they move together in a coupled configuration). With reference to FIGS. 14a to 14c, the guide plates 40 move from bottom to top (arrow 146) such that there is relative movement of the pins 60, 62 along the channels 80, 82 in the direction from top to bottom of the phone. During initial movement of the guide plate 60, as shown in FIG. 14a, the pins 60, 62 attached to the keypad unit 14 travel along the lower horizontal section 144 of the channels 80. Then, with reference to FIG. 14b, there is relative movement of the pins 60, 62 along the diagonal section 142, each pin 60, 62 moving relative to the guide 40 in a direction towards the upper surface at the bottom end of the phone 10. Since, the keypad unit 14, to which the pins 60, 62 are attached, is arranged for sliding movement in a direction parallel to the thickness of the device, the relative movement of the pins 60, 62 and guide plates 40, when the pins 60, 62 travel along the diagonal section 142 of the channels 80, causes the keypad unit 14 to move parallel to the thickness of the device from its depressed position to its fully raised position (the direction represented by arrow 148). As shown in FIG. 14c, the pins 60, 62 then move off the diagonal section 142 to the upper horizontal section 140, whereupon the guide plates 40 abut an end stop 100 formed in the housing 11 (see FIG. 9).

The start and end (when moving in this direction—arrow 146) of the diagonal section 142 of each channel 80 are positioned such that the movement of the keypad unit 14 from the depressed position to the fully raised position starts just after the chamfered bottom edge 12b of the cover 12 begins to partially overlie the chamfered top edge 14t of the keypad unit 14 and ends just as the chamfered edges have passed each other and the upper surfaces of the keypad unit 14 and cover 12 are flush and directly adjacent to each other. The end stop 100 is positioned such that the pins 60, 62 just reach the start of the upper horizontal section 140 of the channel, but are prevented from travelling further along this section 140. The cover 12 is therefore prevented from moving further apart from the keypad unit 14 and the forming of a gap between the cover 12 when extended and the keypad unit 14 when raised is substantially prevented.

In the open configuration, if a user exerts pressure on the keypad unit 14, the pins 60 and 62 attached to the keypad unit 14 will be urged downwards on the upper horizontal section 140, which will simply react the force, there being no resulting movement of the keypad unit 14 or the cover 12. The upper horizontal section 140 thus acts as a stop, preventing lowering of the keypad unit 14 by direct pressure on the keypad unit 14, when the phone 10 is in its open configuration. The keypad unit is thus effectively locked in position.

Movement to cause the phone 10 to move from its open configuration to its closed configuration is simply effected by reversing the above steps. Thus, the cover 12 is moved by the user from the fully extended position towards the retracted position. The dowel pins on the cover 12 are held by the recesses 94 of the latches 92, which are unable to release the cover dowel pins by virtue of rotational movement of each latch 92 being prevented by the ledge 98 on the housing 11. Movement of the cover 12, thus causes movement of the guide plates 40, and therefore relative movement between the pins 60, 62 on the legs 42, 44 of the keypad unit 14 and the channels 80 in the guide plates 40. The pins 60, 62 of the keypad unit 14 move from the upper horizontal section 140 down the diagonal section 142 of the channels 80, thus causing sliding movement of the keypad unit 14 along the slide channels 46. As the pins 60, 62 of the keypad unit 14 leave the diagonal section 142 of the channels 80 to move into the lower horizontal section 144, the latches 92 move towards the recess 99 in the ledge 98. The latches 92 are then urged into the recesses 99 by action of the springs 96, thus releasing the cover dowel pins, and ceasing sliding movement of the guide plates 40. The cover 12 then slides home to the fully retracted position, when the top edge of the cover 12 abuts a lip on the top edge of the housing 11.

It will be seen that the mechanism for causing movement of the keypad unit 14 in dependence on the movement of the cover unit 12 is rather elegant. In particular, all parts needed to effect the movement may be provided along the lateral edges of the device. Also, the mechanism relieves the need for springs or scissor mechanism underneath the keypad unit 14. Thus, the space underneath the keypad unit 14 may be made available for use by other components. In the first embodiment, a battery (not shown) is accommodated in the space beneath the keypad unit 14.

Figure 15:
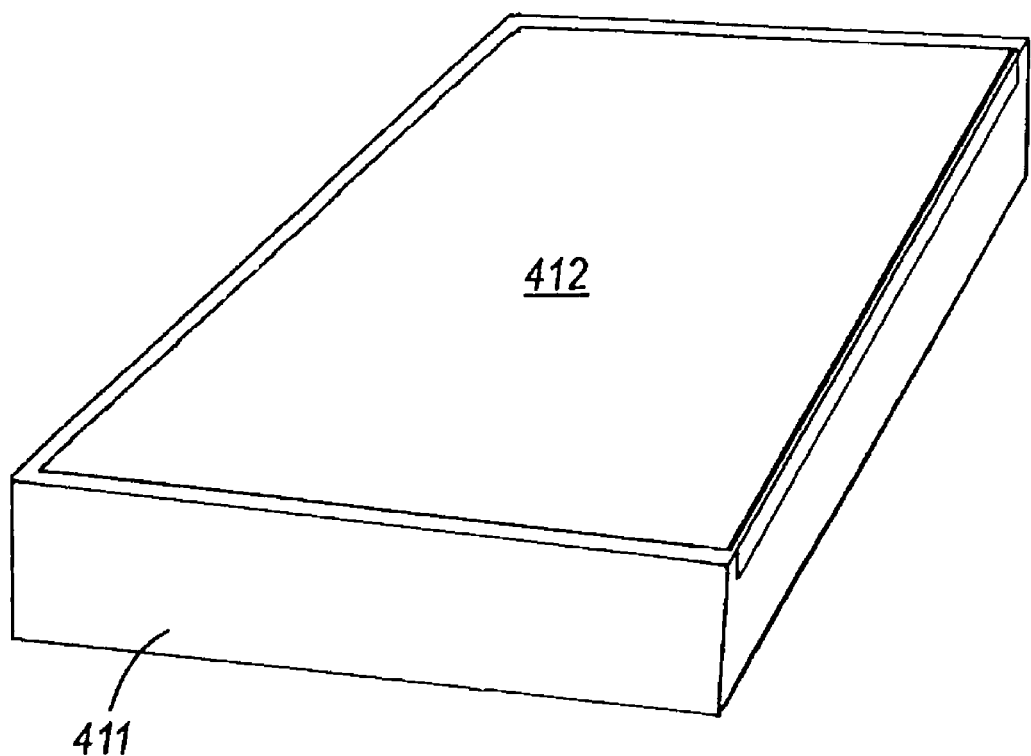
FIG. 15 shows a perspective view of a PDA according to a second embodiment of the invention in which the phone is in a closed configuration.
Figure 16:
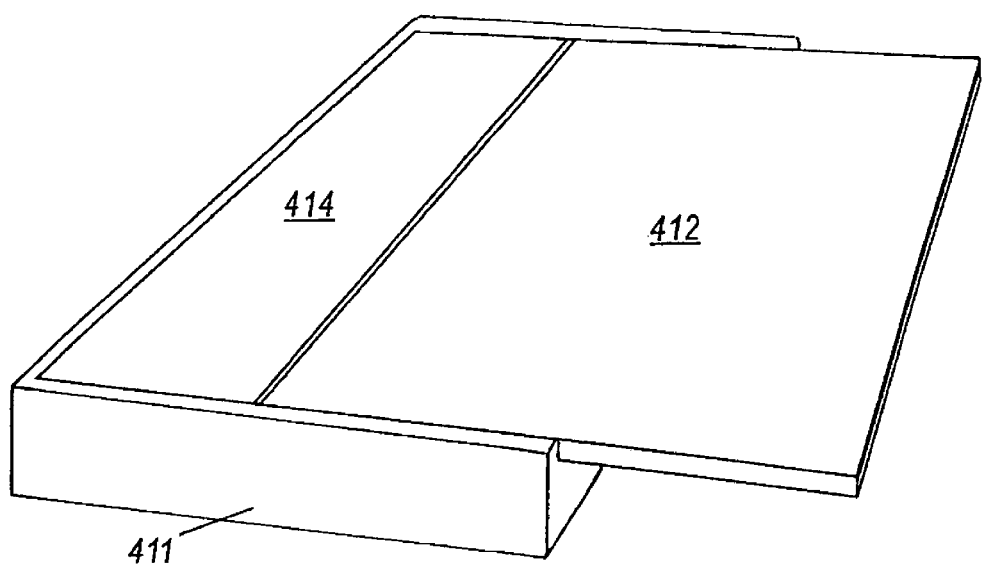
FIG. 16 shows a perspective view of the PDA of FIG. 15 in its open configuration.

FIGS. 15 and 16 show schematically a mobile PDA (personal digital assistant) in accordance with a second embodiment of the present invention, which is similar in mechanical function to the phone of the first embodiment. As shown in FIG. 15, the PDA comprises a housing 411, a first unit in the form of a cover 412, and a second unit in the form of a concealable touch screen unit 414 (shown only in FIG. 16). The cover 412 is mounted for sliding movement from a contracted position (the "first configuration" as shown in FIG. 15) to a fully extended position (the "second configuration" as shown in FIG. 16).

The concealable touch screen unit 414 is mounted for sliding movement relative to the housing 411 from a depressed position to a fully raised position. The upper surface of the concealable touch screen unit 414 defines a touch screen. The upper surface of the cover 412 comprises a display screen incorporating a touch-screen function. (The concealable touch screen unit 414 may also have a display function too).

The principal differences between the shape and mechanical functionality of the phone of the first embodiment and the PDA of the second embodiment will now be described. The PDA of the second embodiment has in its first configuration (FIG. 15) a width that is longer than its height (when viewed in plan), with the concealable touch screen unit 414 being at its lowermost (depressed) position. The intended orientation of the device when in the second configuration may determine which dimension is measured as the width and which as the height. Alternatively, the top and bottom of the device could be defined by requiring the cover to move in the direction of bottom to top when being moved towards its fully extended position. The PDA may be considered as a "landscape" version of the "portrait" phone of the first embodiment. As a result of the relative large width to height ratio of the cover, the guide members (not shown, but similar in construction and design to those described above) are connected to each other by means of two cross-braces (not shown), which assist in the smooth opening and closing of the device (reducing the risk of jamming), especially if the user pushes the cover up or down on one extreme side only.

When the PDA is in the second configuration (FIG. 16), the touch screen of the concealable touch screen unit 414 and the touch screen of the cover lie flush adjacent to each other to define a larger unified touch screen (albeit with a physical break, but substantially no gap, at the junction between the two touch screens). The edges and corners of the PDA shown in FIGS. 15 and 16 may of course be more or less rounded than shown in the Figures.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The first and/or the second units need not be slidably mounted relative to the housing and may instead move by other means, for example including pivoting or rotating mechanisms.

The guide plates could be replaced with another mechanism linking movement of the cover to the keypad unit. For example, laterally arranged rods could be provided each rod having a cam surface for engaging a follower attached to the keypad unit.

The latches for engaging and disengaging from the dowel pins on the cover could be replaced with a different mechanical means. For example, each guide member and its releasably engaging latch could be replaced with a longitudinally arranged telescopic member extendable by means of movement of the cover relative to the housing. The telescopic member could have a plurality of telescopic sections including an end section that only moves in the longitudinal direction when all other telescopic sections have been fully extended. This end section could include a cam causing movement of a follower attached to the keypad unit.

The device may be in the form of a device other than a mobile phone. For example, the device may be in the form of a personal digital assistant (PDA), mobile computer, games console, media player, or electronic portable navigation device (i.e. a "sat-nav" device). In the figures, where the device is in the form of a mobile phone, the phone is taller than it is wide, both when fully extended and when closed. In the case of other devices, it may be appropriate for the device to be wider than it is tall. For example, a PDA may have such a shape so that the a full QWERTY keyboard/keypad can be accommodated on the keypad unit. Such a possible configuration is of course shown in FIGS. 15 and 16.

The keypad unit when in its fully raised position need not lie flush and level with the cover. It may in certain applications for example be preferable for the pop-up unit to be inclined relative to the slidable cover. In certain embodiments, it may be desirable for the keypad to rise to lie in a plane different from that in which the cover lies.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An electronic hand-held device comprising a housing, a first unit having a first upper surface and a second unit having a second upper surface, and a guide member, wherein the first unit is mounted for movement relative to the housing from a contracted position to a fully extended position, the second unit is mounted for movement relative to the housing from a depressed position to a fully raised position, the first unit is movably mounted relative to the second unit such that the handheld device has at least two configurations, including:

a first configuration in which the first unit is in the contracted position, the second unit is in the depressed position, and the second upper surface is positioned beneath the first upper surface, and a second configuration in which the first unit is in the fully extended position, the second unit is in the fully raised position, and the second upper surface is adjacent to and level with the first upper surface, and wherein the movement of the second unit depends on the movement of the first unit by the guide member, the device being so arranged that for a part of the movement of the first unit from the contracted position to the fully extended position there is relative movement between at least a part of the guide member and the first unit, but substantially no relative movement between said part of the guide member and the second unit, wherein for a different part of the movement there is relative movement between said at least a part of the guide member and the second unit, and substantially no relative movement between the guide member and the first unit.

2. A device according to claim 1, wherein the device is so arranged that the first unit causes movement of the guide member for only a portion of the movement at or near the position in which the device is in the second configuration.

3. A device according to claim 1, wherein the device is arranged such that the movement of the second unit depends on the movement of the first unit by the guide member being arranged to couple with and decouple from the first unit.

4. A device according to claim 3, wherein the guide member has a releasably engaging member and the first unit has a corresponding part, wherein the releasably engaging member is engaged to releasably engage the corresponding part such that as the first unit moves past a position during movement towards the fully extended position the engaging member engages the corresponding part, wherein as the first unit moves past a position during movement towards the contracted position the engaging member disengages from the corresponding part on the first unit.

5. A device according to claim 1, comprising two or more longitudinally extending guide members.

6. A device according to claim 5, wherein a brace extends between the two or more guide members.

7. A device according to claim 5 wherein the device has lateral edges and the guide members are mounted along the lateral edges of the device.

8. A device according to claim 1, wherein at least a part of the guide member is arranged such that the guide member holds the second unit firmly in position in said fully raised position, when the first unit is in said fully extended position, so that any significant downwards movement of the second unit is prevented when pressure is exerted by a user on the second upper surface when the first unit is in said fully extended position.

9. A device according to claim 1, wherein one of the guide member and the second unit comprises a guide surface and the other of the guide member and the second unit comprises a guide surface follower arranged such that movement of the guide surface relative to the housing causes movement of the guide surface follower relative to the housing and relative to the guide surface, wherein movement of the guide member relative to the second unit causes movement of the second unit relative to the housing.

10. A device according to claim 9, wherein a part of the guide surface is shaped to hold the second unit firmly in position in said fully raised position, when the first unit is in said fully extended position.

11. A device according to claim 1, wherein the first part is provided with a spring mechanism which, when the first part is positioned near to the fully extended position, resiliently urges the first part towards the fully extended position and which, when the first part is positioned near the contracted position, resiliently urges the first part towards the contracted position.

12. A device according to claim 11, wherein the second part is resiliently urged towards the fully raised position when near the fully raised position primarily by the combination of the resilient urging of the first part to the fully extended position by the spring mechanism and the dependency of the movement of the second unit on the movement of the first unit.

13. An electronic hand-held device according to claim 1, wherein the device is generally rectangular in shape when in the first configuration.

14. An electronic hand-held device according to claim 1, wherein the device has a width and a height, and the width is greater than the height when the device is in the first configuration.

15. An electronic hand-held device according to claim 1, wherein the device includes a touch-screen area which extends from the first unit to the second unit.

16. An electronic hand-held device according to claim 1, wherein when the device is in the second configuration, the structure defining the second upper surface abuts the structure defining the first upper surface and the second upper surface is substantially flush with the first upper surface.

17. An electronic hand-held device according to claim 1, wherein the device is in the form of a mobile telecommunications device.

\* \* \* \* \*